(12) United States Patent
Cha

(10) Patent No.: US 12,292,501 B2
(45) Date of Patent: May 6, 2025

(54) COVER DEVICE FOR REDUCING REFRACTION OF RADAR RADIO WAVES

(71) Applicants: Hyundai Motor Company, Seoul (KR); Kia Corporation, Seoul (KR)

(72) Inventor: Dong Eun Cha, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 506 days.

(21) Appl. No.: 17/526,376

(22) Filed: Nov. 15, 2021

(65) Prior Publication Data

US 2022/0317287 A1    Oct. 6, 2022

(30) Foreign Application Priority Data

Apr. 5, 2021 (KR) .................. 10-2021-0044178

(51) Int. Cl.
*G01S 13/931* (2020.01)
*H01Q 15/00* (2006.01)
*H01Q 15/10* (2006.01)

(52) U.S. Cl.
CPC ....... *G01S 13/931* (2013.01); *H01Q 15/0086* (2013.01); *H01Q 15/10* (2013.01)

(58) Field of Classification Search
CPC ........................................................ H01Q 1/40
See application file for complete search history.

(56) References Cited

U.S. PATENT DOCUMENTS

| | | | |
|---|---|---|---|
| 7,724,180 B2 | 5/2010 | Yonak et al. | |
| 2016/0020370 A1* | 1/2016 | Cai | H01L 33/60 |
| | | | 438/27 |
| 2018/0115059 A1* | 4/2018 | Tokunaga | G01S 7/032 |
| 2020/0127373 A1 | 4/2020 | Bilik et al. | |
| 2020/0271830 A1* | 8/2020 | Abe | G02B 1/118 |
| 2020/0339053 A1 | 10/2020 | Bicego et al. | |
| 2022/0320736 A1* | 10/2022 | Jung | H01Q 1/48 |

FOREIGN PATENT DOCUMENTS

| | | |
|---|---|---|
| EP | 2 151 888 B1 | 2/2015 |
| KR | 10-2015-0102216 A | 9/2015 |

* cited by examiner

*Primary Examiner* — Vladimir Magloire
*Assistant Examiner* — Eric K Hodac
(74) *Attorney, Agent, or Firm* — Morgan, Lewis & Bockius LLP

(57) ABSTRACT

A cover device for reducing refraction of radar radio waves includes a radio wave generator configured to generate radio waves, and a cover part disposed to allow the radio waves to be incident from the radio wave generator and having an incidence section configured to be gradually increased in thicknesses in directions away from a central axis of the radio waves, thereby improving a detection accuracy through a radar by minimizing a phase difference due to refraction of a beam emitted from the radar.

6 Claims, 7 Drawing Sheets

COVER DEVICE FOR REDUCING REFRACTION OF RADAR RADIO WAVES

CROSS REFERENCE TO RELATED APPLICATION

The present application claims the benefit of priority to Korean Patent Application No. 10-2021-0044178, filed on Apr. 5, 2021, the entire contents of which is incorporated herein for all purposes by this reference.

TECHNICAL FIELD

The present disclosure relates to a cover device for reducing refraction of radar radio waves in which refraction of radar radio waves is minimized.

BACKGROUND

Recently, as the development of automatic driving of a vehicle continues, a smart cruise control system is being applied. Such a smart cruise control system enables the vehicle to maintain a constant driving speed without separate manipulation by a driver or enables automatic driving while maintaining a distance from other vehicles.

In this way, the smart cruise control system is equipped with radar for sensing the surrounding environment, and driving stability of the vehicle is improved according to an accuracy of the radar.

A radar transmitting/receiving device for this is installed in the front of a vehicle, and in particular, is installed on a radiator grille. However, a front part of the vehicle, including the radiator grille, has a shape that is curved in accordance with an external feature and affects uniform transmission and reception of radar radio waves according to an incidence angle of a radar beam.

The information disclosed in the Background section above is to aid in the understanding of the background of the present disclosure, and should not be taken as acknowledgement that this information forms any part of prior art.

SUMMARY

Accordingly, the present disclosure has been made keeping in mind the above problems occurring in the related art, and the present disclosure is intended to provide a cover device for reducing refraction of radar radio waves, the cover device being configured to improve detection accuracy through radar by minimizing a phase difference due to refraction of a beam emitted from the radar.

In order to achieve the above objective, according to one aspect of the present disclosure, there may be provided a cover device for reducing refraction of radar radio waves, as shown in FIGS. 1 to 2, the device including: a radio wave generator configured to generate radio waves; and a cover part disposed to allow the radio waves to be incident from the radio wave generator 10 and having an incidence section configured to be gradually increased in thicknesses in directions away from a central axis of the radio waves.

The incidence section of the cover part may be configured such that the thicknesses thereof are determined in the directions away from the central axis of the radio waves, according to relative dielectric permittivity determined by a material of the cover part and an incidence angle of the radio waves.

The cover part may include: a first layer including a rear surface part to which the radio waves are incident, the first layer having a specific color, being formed in a shape according to an external feature, and allowing the radio waves to penetrate therethrough; and a second layer including a front surface part from which the radio waves are emitted, the second layer having a transparent color, coupled with and covering the first layer, and allowing the radio waves to penetrate therethrough.

The first layer may be configured to have a uniform thickness, and the second layer may be configured to be gradually increased in thicknesses in the directions away from the central axis of the radio waves.

The first layer and the second layer may be respectively configured to be increased in thicknesses in the directions away from the central axis of the radio waves.

The cover part may further include a mesh layer disposed between the first layer and the second layer, the mesh layer having the same material as the first layer or the same material as the second layer.

The material of the mesh layer may have a dielectric loss lower than the materials of the first layer and the second layer.

The first layer and the second layer may have different materials from each other, thereby having different dielectric permittivities.

Thicknesses of the first layer and the second layer may be configured with a combination of multiples of wavelength of the penetrated radio waves such that phases of the radio waves incident on the first layer and of the radio waves emitted from the second layer are the same as each other.

As described above, the cover device for reducing refraction of radar radio waves having the structure as described above minimizes the phase difference due to the refraction of the beam emitted from the radar so that the detection accuracy through the radar is improved.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinbelow, a cover device for reducing refraction of radar radio waves according to exemplary embodiments of the present disclosure will be described with reference to the accompanying drawings.

Figure 1:
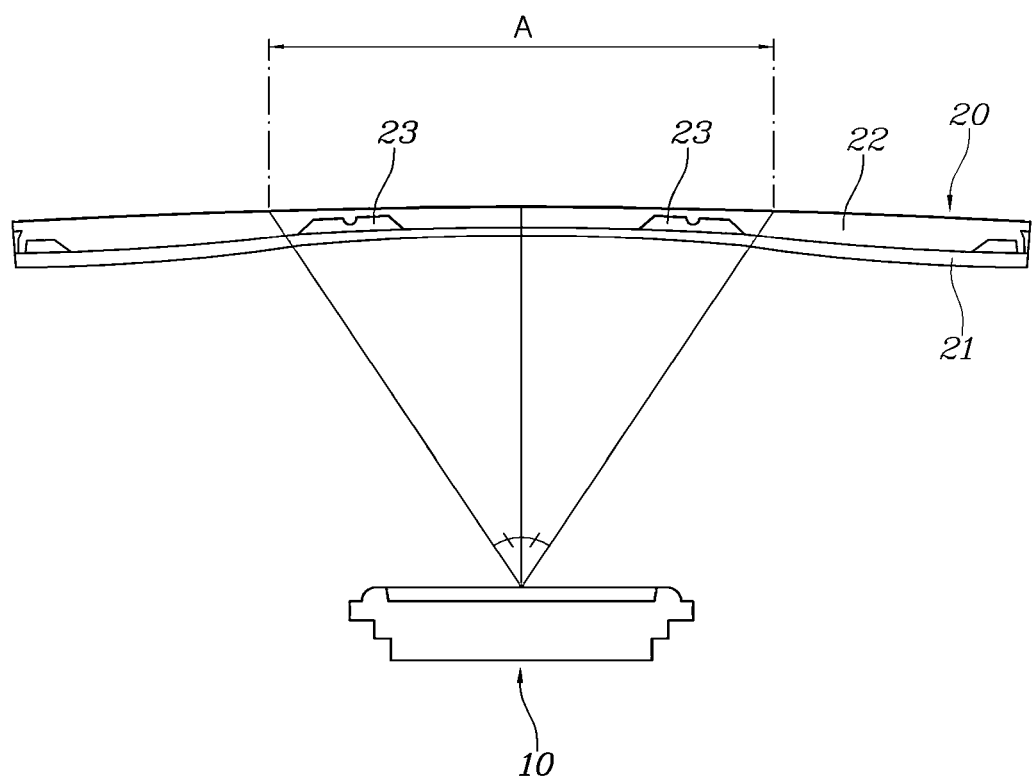
FIG. 1 is a view showing a cover device for reducing refraction of radar radio waves according to an exemplary embodiment of the present disclosure.
Figure 2:
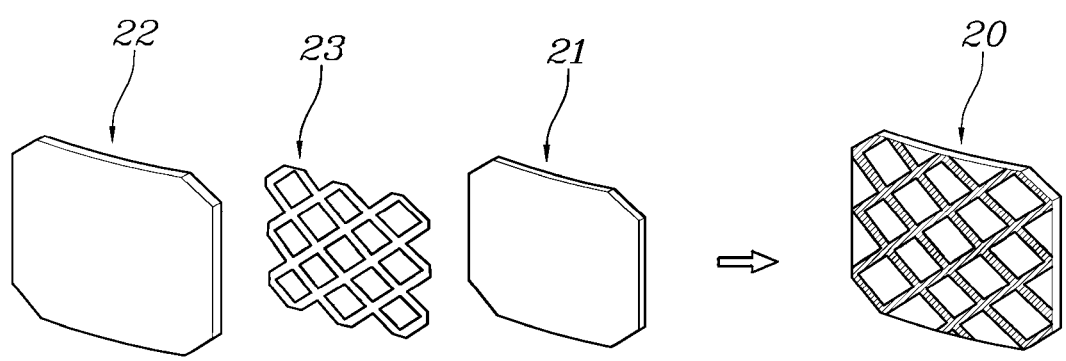
FIG. 2 is an assembly view of the cover device for reducing refraction of radar radio waves shown in FIG. 1.
Figure 3:
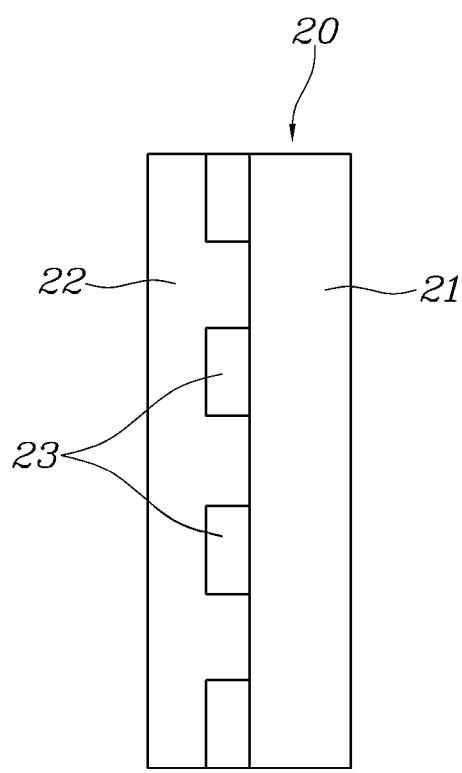
FIG. 3 is a view showing the cover device for reducing refraction of radar radio waves according to an exemplary embodiment of the present disclosure.
Figure 4:
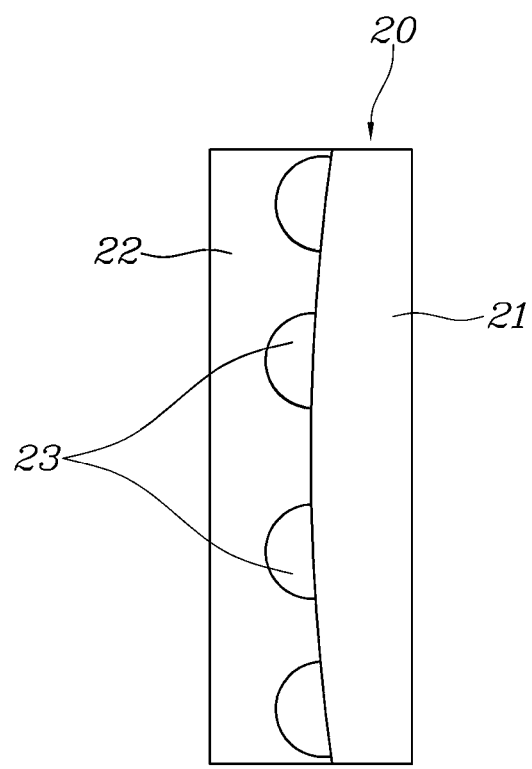
FIG. 4 is a view showing a cover device for reducing refraction of radar radio waves according to another exemplary embodiment of the present disclosure.
Figure 5:
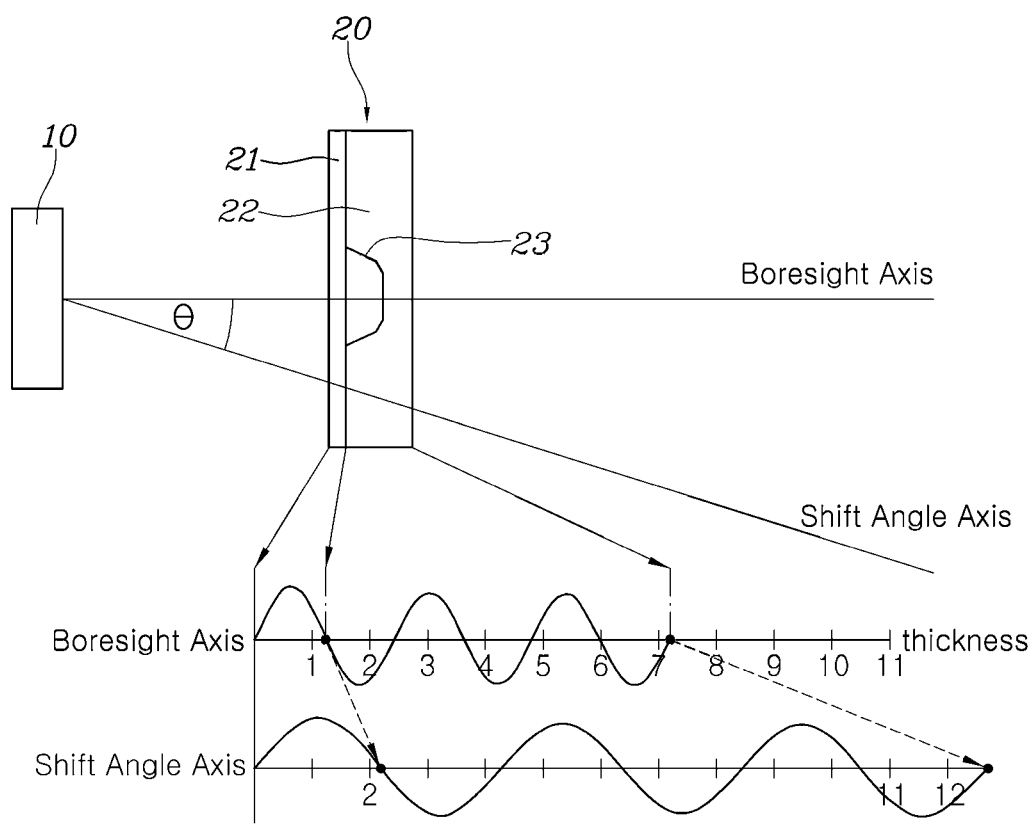
FIG. 5 is a view explaining the cover device for reducing refraction of radar radio waves according to an exemplary embodiment of the present disclosure.
Figure 6:
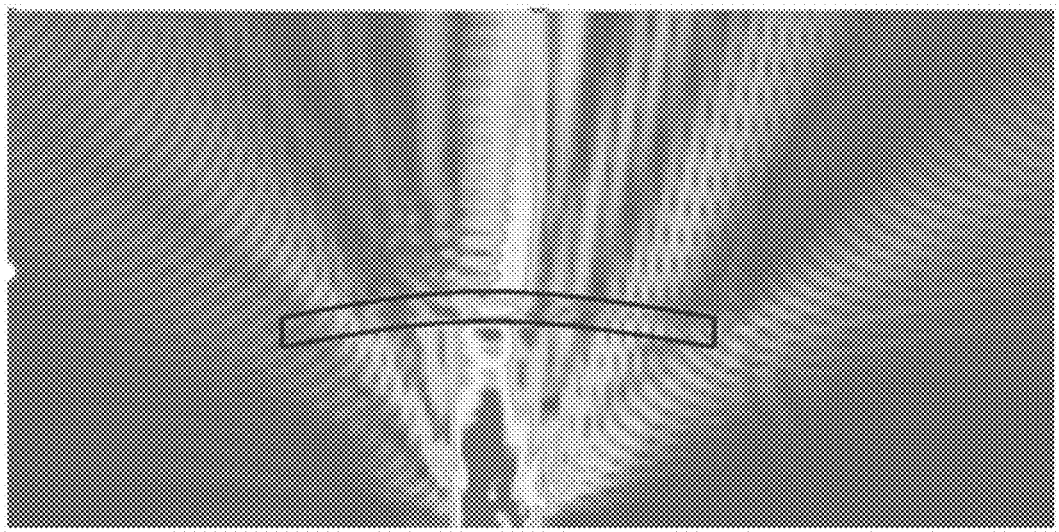
FIG. 6 is a view showing radar radio waves of a conventional cover device.
Figure 7:
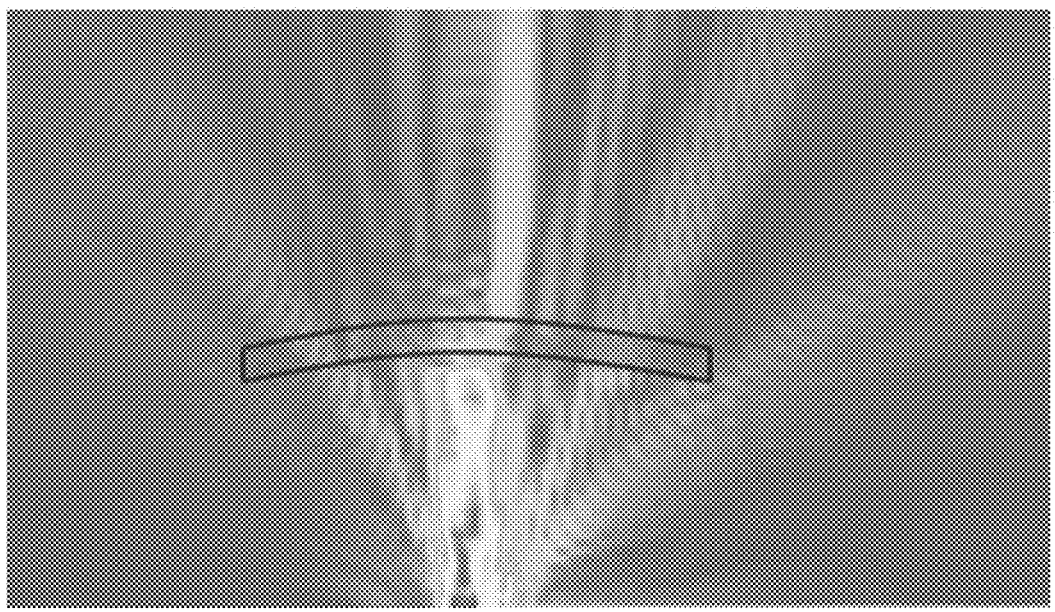
FIG. 7 is a view showing the radar radio waves of the cover device according to an exemplary embodiment of the present disclosure.

FIG. 1 is a view showing a cover device for reducing refraction of radar radio waves according to an exemplary embodiment of the present disclosure, FIG. 2 is an assembly view of the cover device for reducing refraction of radar radio waves shown in FIG. 1, FIG. 3 is a view showing the cover device for reducing refraction of radar radio waves according to an embodiment of the present disclosure, FIG. 4 is a view showing a cover device for reducing refraction of radar radio waves according to another embodiment of the present disclosure, FIG. 5 is a view explaining the cover device for reducing refraction of radar radio waves according to an exemplary embodiment of the present disclosure, FIG. 6 is a view showing radar radio waves of a conventional cover device, and FIG. 7 is a view showing the radar radio waves of the cover device of the present disclosure.

As shown in FIGS. 1 to 2, the cover device for reducing refraction of radar radio waves according to an exemplary embodiment of the present disclosure includes: a radio wave generator 10 configured to generate radio waves; and a cover part 20 disposed to allow the radio waves to be incident from the radio wave generator 10, and having an incidence section A through which the radio waves are incident, the incidence section A being configured to be gradually increased in thicknesses in directions away from a central axis of the radio wave.

Here, the radio wave generator 10 is radar, and the cover part 20 may be configured as a radome in a shape having a flat or curved surface. Accordingly, the radio wave generator 10 may be installed at the front of the vehicle, and the radio waves generated by the radio wave generator 10 pass through the cover part 20, thereby detecting a target.

Meanwhile, the radio waves generated by the radio wave generator 10 are radiated in a certain range and become to be incident on the cover part 20. In this case, when being at the central axis thereof in the incident section A of the cover part 20, the radio waves are not refracted. However, when being moved away from the central axis thereof in the incident section A of the cover part 20, thereby having an incident angle, the radio waves will be refracted or reflected, resulting in penetration loss thereof.

Accordingly, the cover part 20 of the present disclosure is configured such that an incident section A through which the radio waves are incident is to be gradually increased in thicknesses in the directions away from the central axis of the radio wave.

That is, a phase difference of the radio waves in the cover part 20 is caused by the dielectric permittivity of the cover part 20 and the incident angle of the radio waves. In this case, as the incident section A of the cover part 20 according to an exemplary embodiment of the present disclosure is configured to be gradually increased in thicknesses in the directions away from the central axis, the phase difference due to the incident angle of the radio waves is compensated, whereby the penetration loss due to refraction and reflection of the radio waves is reduced.

Specifically, the incidence section A of the cover part 20 has the thicknesses of amounts determined in directions away from the central axis of the radio waves, according to an incidence angle of the radio waves and relative dielectric permittivity according to a material of the cover part 20. That is, the thickness of the cover part 20 is determined according to phases of the radio waves, wavelengths of the radio waves, the relative dielectric permittivity of the cover part, and the incident angle of the radio waves. Accordingly, the present disclosure allows the refraction due to the incident angles of the radio waves to be compensated by increasing the thickness of the cover part 20 in proportion to the incident angle of the radio waves. Such a cover part 20 maintains the thickness to be constant in the rest of the area except for the incidence section A through which the radio waves from the radio wave generator 10 are incident, thereby allowing an external feature to be maintained.

On the other hand, as shown in FIGS. 1 and 2, the cover part 20 includes: a first layer 21 including a rear surface part, to which the radio waves are incident, having a specific color, being formed in a shape according to an external feature, and allowing the radio waves to penetrate therethrough; and a second layer 22 including a front surface part from which the radio waves are emitted, being a transparent color, coupled with the first layer 21 so as to cover same, and allowing the radio waves to penetrate therethrough.

Here, the first layer 21 and the second layer 22 are made of materials different from one another so as to have dielectric permittivities different from one another. That is, the first layer 21 may include an opaque ASA material and may be configured to have a specific color. The second layer 22 may include a transparent PMMA material and is coupled with the first layer 21 so as to cover same. In this way, in the cover part 20, the first layer 21 made of the ASA material having a specific color forms the rear surface part, the second layer 22 made of the transparent PMMA material forms the front surface part, and the radio waves generated from the radio wave generator 10 pass through the first layer 21 and the second layer 22 and are emitted. Here, the first layer 21 may be configured to have a relatively small thickness compared to the second layer 22. That is, the first layer 21 has a color, and the thickness of the first layer 21 is made in a form smaller than that of the second layer 22 in consideration of the characteristics of the material.

In addition, the cover part 20 may be configured to further include a mesh layer 23 made of the same material as the first layer 21 or the same material as the second layer 22, between the first layer 21 and the second layer 22. Such a mesh layer 23 is formed on the first layer 21 or the second layer 22, and a shape of the pattern may be determined according to the incident direction of the radio waves and the influence of the radio waves. In the present disclosure, as being applied to a radiator grille, the cover part 20 is formed in a pattern shape matching the shape of the radiator grille.

In addition, the mesh layer 23 may be formed to correspond to the material having a lower dielectric loss among the materials of the first layer 21 and the second layer 22. That is, as the first layer 21 is made of the ASA material and the second layer 22 is made of the PMMA material, the dielectric loss of the second layer 22 is relatively smaller than that of the first layer 21 due to the characteristics of the material. Therefore, the mesh layer 23 may be structured by being formed on the second layer 22. On such a mesh layer 23, metal is deposited to form an external feature and also allows the penetration loss of the radio waves to be reduced. In addition, the mesh layer 23 is configured to minimize an inclination of the circumferential portion 23a thereof, thereby inducing the dielectric loss occurring in the mesh layer 23 to be reduced.

The first layer 21 and the second layer 22 of the above-described cover part 20 may be configured in various embodiment types.

In one embodiment, the first layer 21 may be configured to have the uniform thickness, and the second layer 22 may be configured to be gradually increased in thicknesses in the directions away from the central axis of the radio waves. In this way, the first layer 21 including the ASA material having high dielectric loss is minimized in the thickness thereof, thereby extending with the same thickness, and the second layer 22 including the PMMA material having a relatively low dielectric loss is subjected to adjust the thickness thereof. That is, the second layer 22 is configured to be increased in the thicknesses in the directions away from the central axis of the radio waves generated by the radio wave generator 10, whereby the refraction due to the incident angle of the radio waves is given to be compensated. Meanwhile, the thickness of the mesh layer 23 disposed between the first layer 21 and the second layer 22 may be determined in consideration of dielectric loss according to the material.

Accordingly, as shown in FIG. 3, the cover part 20 includes the first layer 21, the mesh layer 23, and the second layer 22, wherein the thicknesses of the second layer 22 are adjusted according to the incident angle of the radio waves generated from the radio wave generator 10, whereby the refraction due to the incident angle of the radio waves is compensated.

As the embodiment according to the above, the thickness of the cover part 20 may be determined as shown in Table 1 below.

TABLE 1

| | Position | 1st layer | Mesh layer | 2nd layer | Total |
|---|---|---|---|---|---|
| Case 1 | Center(0°) | 1.8t | 2.5t | 5.4t | 7.2t |
| | Boundary (42.6°) | 1.8t | | 7.6t | 9.4t |

Here, the incidence range (boundary) of the radio waves generated from the radio wave generator 10 may vary according to the specifications of the radio wave generator 10 and a location of the cover part 20. In addition, the thicknesses of the first layer 21, the mesh layer 23, and the second layer 22 may also vary according to the dielectric permittivity of each material and the incident angle of the radio waves.

Meanwhile, as another embodiment, the first layer 21 and the second layer 22 are each configured to be increased in thicknesses in the directions away from the central axis of the radio waves.

At this time, the first layer 21 and the second layer 22 may each be configured to have the thicknesses, of the portion being matched with the central axis of the radio waves, to be minimized. In this case, the first layer 21 and the second layer 22 are adjusted to have thicknesses increased in the directions away from the central axis of the radio waves, whereby the refraction due to the angle of incidence of the radio waves is compensated. Here, the first layer 21 includes the ASA material having a high dielectric loss, and the second layer 22 includes the PMMA material having a relatively small dielectric loss, so the thicknesses of the second layer 22 may be adjusted to be larger.

Accordingly, as shown in FIG. 4, the cover part 20 includes the first layer 21, the mesh layer 23, and the second layer 22, wherein the thicknesses of the first layer 21 and the second layer 22 are adjusted according to the incident angle of the radio waves generated from the radio wave generator 10, whereby the refraction due to the incident angle of the radio waves is given to be compensated.

As the embodiment according to the above, the thickness of the cover part 20 may be determined as shown in Table 2 below.

TABLE 2

| | Position | 1st layer | Mesh layer | 2nd layer | Total |
|---|---|---|---|---|---|
| Case 2 | Center(0°) | 1.2t | 3.4t | 6.0t | 7.2t |
| | Boundary (42.6°) | 1.7t | | 8.4t | 10.1t |

Here, the incidence range (boundary) of the radio waves generated from the radio wave generator 10 may vary according to the specifications of the radio wave generator 10 and a location of the cover part 20. In addition, the thicknesses of the first layer 21, the mesh layer 23, and the second layer 22 may also vary according to the dielectric permittivity of each material and the incident angle of the radio waves.

Meanwhile, the thicknesses of the first layer 21 and the second layer 22 described above may be selected as a combination of random multiples so that the phases of the radio waves incident on the first layer 21 and of the radio waves emitted from the second layer 22 are the same. That is, as shown in FIG. 5, the first layer 21 and the second layer 22 are formed in order for the phases of the incident waves and the output waves of the radio waves to become to be same when the radio waves generated by the radio wave generator 10 pass through the cover part 20, wherein the incident waves and the output waves of the radio waves may be selected as a combination of multiples of a ¼ wavelength & a ¾ wavelength of the penetrated radio waves, respectively, or a combination of multiples of ½ wavelengths, respectively. That is, the thicknesses of the first layer 21 and the second layer 22 may be selected in consideration of the wavelengths according to the dielectric permittivity due to the material of the first layer 21 or the second layer 22 in addition to the speed and frequency of the radio waves generated from the above-described generator.

As described above, the thicknesses of the cover part 20 are adjusted in consideration of the incident angle of the radio waves generated from the radio wave generator 10 and the dielectric permittivity of each material, whereby the phase difference due to the refraction of the radio waves is minimized. Accordingly, the detection accuracy through the radar is improved in the present disclosure.

That is, as shown in FIG. 6, when looking at the resistance strength of the radio waves as the radio waves move, it may be seen that the conventional radome, as having a uniform thickness layer, has a high resistance strength of the radio waves.

However, as shown in FIG. 7, it may be confirmed that the resistance intensity of the radio waves in the present disclosure is reduced compared to that of the conventional art.

Although the present disclosure has been shown and described in connection with specific embodiments, those skilled in the art will appreciate that various modifications, additions, and substitutions are possible, without departing from the scope and spirit of the disclosure as disclosed in the accompanying claims.

What is claimed is:

1. A cover device for reducing refraction of radar radio waves, the device comprising:
a radio wave generator configured to generate radio waves; and
a cover part disposed to allow the radio waves to be incident from the radio wave generator and having an incidence section configured to be gradually increased in thicknesses in directions away from a central axis of the radio waves, wherein the cover part comprises:

a first layer including a rear surface part to which the radio waves are incident, the first layer having a specific color, being formed in a shape according to an external feature, and configured to allow the radio waves to penetrate therethrough; and a second layer including a front surface part from which the radio waves are emitted, the second layer having a transparent color, coupled with and covering the first layer, and configured to allow the radio waves to penetrate therethrough, a surface of the second layer being entirely covered by a surface of the first layer, wherein the cover part further comprises a mesh layer disposed between the first layer and the second layer, the mesh layer having the same material as the first layer or the same material as the second layer, wherein the first layer and the second layer are respectively configured to be increased in thicknesses in the directions away from the central axis of the radio waves, wherein the cover part has a varying thickness in the incidence section through which the radio waves are incident and a constant thickness in an area outside the incidence section, thereby allowing the external feature to be maintained.

2. The device of claim 1, wherein the incidence section of the cover part is configured such that the thicknesses thereof are determined in the directions away from the central axis of the radio waves, according to relative dielectric permittivity determined by a material of the cover part and an incidence angle of the radio waves.

3. The device of claim 1, wherein the first layer and the second layer are respectively configured to be increased in thicknesses in the directions away from the central axis of the radio waves.

4. The device of claim 1, wherein the material of the mesh layer has a dielectric loss lower than the materials of the first layer and the second layer.

5. The device of claim 1, wherein the first layer and the second layer have different materials from each other, thereby having different dielectric permittivities.

6. The device of claim 5, wherein thicknesses of the first layer and the second layer are determined based on a combination of multiples of wavelengths of the penetrated radio waves such that phases of the radio waves incident on the first layer and of the radio waves emitted from the second layer are the same as each other.

* * * * *